United States Patent [19]

Brownlee

[11] 4,310,264
[45] Jan. 12, 1982

[54] BUOYANT PIPE SYSTEM

[76] Inventor: William L. Brownlee, 2070 University Ave., Berkeley, Calif. 94704

[21] Appl. No.: 134,997

[22] Filed: Mar. 31, 1980

[51] Int. Cl.³ .............................................. F16L 1/04
[52] U.S. Cl. ................................... 405/172; 405/171; 405/154
[58] Field of Search .............................. 405/154–172, 405/64; 137/236

[56] References Cited

U.S. PATENT DOCUMENTS 3,467,013  9/1969  Conner .......................... 405/171 X
3,708,983  1/1973  Brown et al. .......................... 405/64
3,779,020  12/1973  Muramatsu et al. .................. 405/64
4,110,994  9/1978  Lundh .............................. 405/168 X Primary Examiner—Dennis L. Taylor
Attorney, Agent, or Firm—Bielen and Peterson

[57] ABSTRACT

A buoyant pipe system designed for underwater use of pipe conduits with equalized inside and outside pipe conduit pressures when transporting liquid, the conduits being thin-walled with external water inlet means, and being capped by a floatation chamber, the pipe system having a series of spaced anchor assemblies including an anchor member and a cable connector for anchoring the pipe conduit in an underwater floating condition.

10 Claims, 8 Drawing Figures

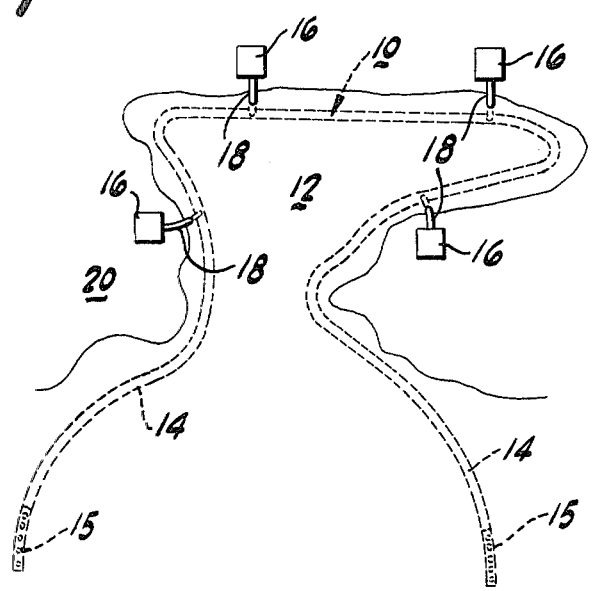
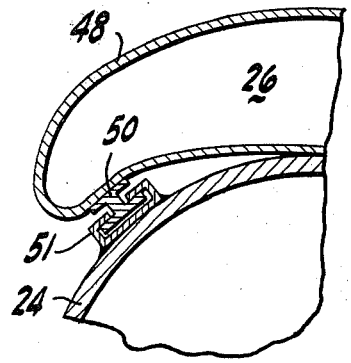

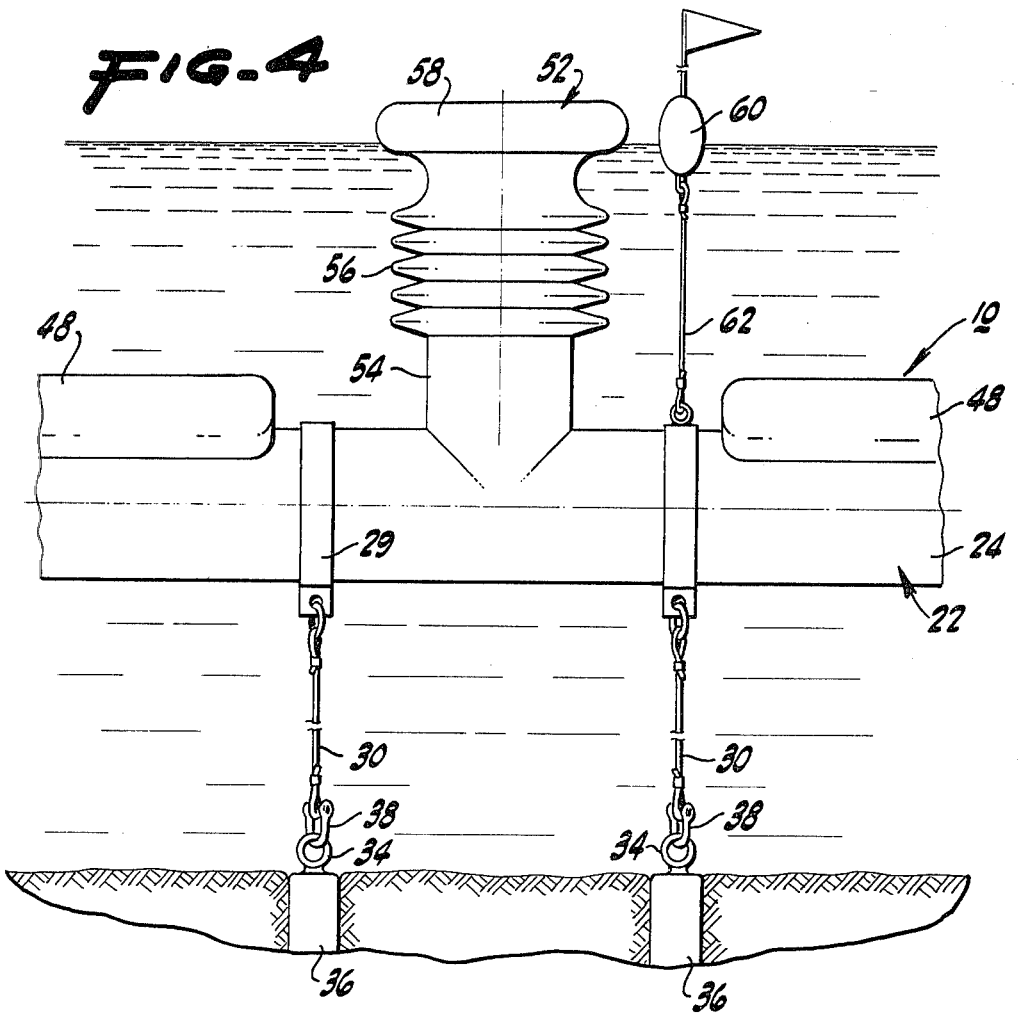

BUOYANT PIPE SYSTEM

BACKGROUND OF THE INVENTION

This invention relates to a buoyant pipe system, in particular a submerged pipe system that is anchored to the floor of a water body and buoyed by a floatation chamber above the water body floor. The buoyant pipe system is designed in particular for the conveyance of wastewaters to an off-shore outfall point where the wastewaters are discharged for dispersion by ocean currents.

The problem of disposal of wastewaters has plagued many communities and has become a regional rather than community problem, particularly in coastal areas of large urban growth. When considered from a regional perspective, the volumes of wastewaters for treatment and disposal become remarkably large. With increasingly stringent anti-pollution requirements viable solutions become limited in number.

One solution, disposal at sea, is receiving renewed interest as the ecology of the sea becomes understood to a greater extent. While there may exist initial reservations about disposing of wastewaters often rich in organic materials and metal compositions of varying toxicity, the proposition requires careful consideration. As pointed out in the reasoned article, "The Disposal of Waste in the Ocean" by Bascom, *Scientific America*, Vol. 231, No. 2 (August 1974), in citing John Delsaacs of Scipps Institution of Oceanography, ". . . the sea is starved for the basic plant nutrients and it is a mystery to me why we should be concerned with their thoughtful introduction into coastal seas in any quantity that man can generate in the foreseeable future." It is pointed out in the article that marine life can not only tolerate, but can be enhanced by the introduction of certain wastes, that there are optimum levels of not only organic materials, but of metals such as zinc and copper generally considered toxic. Such materials, it is stated, must be presented to the ocean in the right places and at reasonable rates. Materials which should not be introduced to the ocean should be prevented entry at the source. Such source control is a consideration in every advanced regional planning system, whereby industrial discharges are required to have prior removal and alternate disposal of high toxics which are inadequately absorbed by the ocean ecology. Affirmative wastewater aquaculture is discussed in *Marine Outfall Systems*, Grace, sec. 3-9, (Prentice Hall 1978).

A substantial limiting factor in implementing a regional scale ocean outfall system is the massive investment in pipe and in the acquisition of on shore land for a pipe line right-of-way. Additionally, with regard to the terminal outfall, conventional outfall systems are difficult to maintain and subject to corrosion, sand abrasion and collapse from alluvial-type burial.

The pipe system proposed herein avoids the disadvantages of the conventional land collection and sea bed outfall systems. The system is similar in certain respects, but radically different in other respects from the prior art systems of Giraud et al, "Submarine Conveyance of Fluids Through a Flexible Pipe Line", U.S. Pat. No. 3,216,203, issued Nov. 9, 1965. It is proposed therein to suspend or anchor a buoyant pipe at the depth where the internal fluid pressure for transport of the gas or lighter than water liquid will equal the external water pressure, thereby allowing a flexible or thin wall pipe. It is proposed therein that weights or alternatively buoyant material be added to the pipe to properly achieve the equilibrium depth.

Unlike the system of Geraud et al, it is proposed herein that a pipe system be assembled which conveys wastewater to an outfall in which pressure is equalized by the admission of seawater wherein internal and external pressure are substantially equal regardless of depth. Furthermore, the pipe conduits forming the system are buoyed by a separate buoyancy chamber attached to the top of the conduit and are anchored in a submerged position above the floor of the water body. Prior to outfall the pipe system includes a plurality of submerged entry branches from multiple wastewater sources.

By maintaining a positive buoyancy to the pipe conduits, the system may follow the contour of the bed of the water body, or by use of varying length anchor cables follow a straight line or predetermined curve, or any combination of the aforementioned.

SUMMARY OF THE INVENTION

The buoyant pipe system of this invention is designed in particular for a submerged wastewater system that collects wastes from multiple shore sources and conveys the wastewaters to an off shore dispersion point. The system is particularly suitable for a regional plan where multiple communities border a waterway such as a bay or river that eventually communicates with the ocean.

The pipe system is designed for location in the waterway in a submerged condition with feeder lines from on shore wastewater sources. The feeder lines connect to a submerged central pipe conduit that is buoyant and anchored to the bed of the waterway by a chain or cable. The pipe conduit is of relatively thin wall construction since internal and external pressures are substantially the same. The substantially equal pressures are a result of relief valves installed periodically along the length of the conduit which bleed off air and gases trapped in the pipe system.

The conduit in cross section is constructed with a large cylindrical section for conveyance of wastewater, and a float chamber capping section for buoyancy. The structure of the pipe conduit is formed by any conventional means. For example, the conduit segments may be formed on a large mandrel with appropriate coupling designs at each end. The capping air conduit may be formed as a elastomeric bladder or a rigid chamber bonded to the conduit segment by heat treatment or other means. The conduit should be fabricated from a polyvinylchloride, fiberglass reinforced or other relatively noncorrosive material that can be fabricated into a large, relatively thin-walled transport vessel.

Installed the pipe system has a central collection conduit that is always submerged having a diameter of six feet or larger. The central collection conduit could run the length of a river, increasing in diameter at spaced intervals to accommodate the volume of waste material introduced by reparian communities. As the river widens, the conduit could divide from a single centrally positioned line into a bifurcated line proximate to each shore. For ocean off-fall the two lines can reunite into a single or a dual line for dispersal at one off-shore location, or remain divided and diverge to two separate off-shore dispersed locations.

In a bay, the central collection conduit could run the perimeter of the bay in a loop, thereby providing two lines for united or divergent off-shore dispersion.

BRIEF DESCRIPTION OF THE DRAWINGS

FIG. 1 is a schematic illustration of the pipe system installed in an ocean bay.

FIG. 2 is a cross sectional view of a pipe conduit with an anchoring means.

FIG. 3 is an enlarged cross-sectional view of a segment of the pipe conduit of FIG. 2.

FIG. 4 is a side elevational view of a segment of the pipe conduit with an off-shore disposal orifice.

FIG. 5 is a cross sectional view of a segment of the pipe conduit with an air release valve.

FIG. 6 is a cross sectional view of an alternate configuration of a pipe conduit with an anchoring means.

FIG. 7 is a cross sectional view of a further alternate configuration of a dual pipe conduit with an anchoring means.

FIG. 8 is a cross sectional view of a further alternate configuration of a dual pipe conduit with an anchoring means.

DETAILED DESCRIPTION OF THE PREFERRED EMBODIMENTS

Referring now to FIG. 1, a schematic illustration of the wastewater pipe system is shown. The exemplar installation includes a submerged central collection line 10 that loops around a bay 12. The collection line 10 has two divergent ocean outfall lines 14 that terminate in diffusers 15 for dispersing wastewaters into the ocean. The outfall lines 14 may be from one to fifty miles in length depending on the volumes handled and the ecological conditions at the diffusers.

Located on shore are various disposal stations 16 where treated, partially treated or untreated wastewaters are piped to the submerged collection line 10 via feed lines 18 which are in part on shore and in part underwater. Because the collection line is located proximate the shoreline 20 of the bay, and encircles the entire bay, the length of the feeder lines 18 are minimized. The feeder lines 18 are generally conventional in makeup and are conventionally supported, unless unusually large in diameter wherein the system for submerged floatation of the main collection line can be applied to the feeder lines.

Referring to FIG. 2, the construction of the collection line 10 is illustrated. The collection line 10 is constructed with pipe conduit 22 having a large diameter, cylindrical tube 24 for conveying the wastewater, and an integral floatation chamber 26 mounted on top of the cylindrical tube 24 providing the overall pipe conduit with a positive buoyancy when filled with wastewater.

On the underside of the cylindrical tube 24 portion of the conduit is a connector ring 28 which is mounted on a band 29 that encircles the cylindrical tube and distributes forces focussed at the connection ring 28. The connection ring 28 is connected to a relatively short cable 30 by a cable shackle 32.

The cable 30 is anchored to a ring 34 at the end of an anchor piles 36 by a similar cable shackle 38. The piling 36 is constructed of a material that will resist rot or corrosion such as treated wood or concrete.

The cable 30 maintains the positively buoyant pipe conduit 22 off the water body floor 50 in order to allow currents to pass around the pipe conduit preventing build-up of bed material over the pipe that abrades and potentially can crush the pipe conduit. It is preferred that the cable be at least three feet in length. The ultimate length of the cable is determined by design criteria, for example, the depth of the water 42, the level of the floor, the ultimate depth of the diffusers 15 and the minimum depth of the collection line 10. It is, of course, desirable to consider in such design evaluation that the shorter the cable, the more immune to currents and the more fixed is the location of the pipe system.

The feeder line 18 may be supported on a conventional trestle 44 and either have a degree of slack flexibility to accomodate for movement of the pipe conduit 22, or have a slip coupling 46 which allows for limited displacement of the end of the feeder line in the conduit tube 24. If necessary the pipe conduit can have additional anchoring means such as two spaced piles for limiting movement at the feeder line input by a triangulation effect.

The floatation chamber 26 is mounted on top of the cylindrical tube 24 opposite the connector ring 28 for the cable 30. This location adds to the stability of the pipe line by directing buoyancy forces opposite the anchor restraint. The floatation chamber 26 may be filled with a gas such as air or comprise light-weight material such as polystyrene foam. The floatation chamber may be formed by a structure that is rigid as shown in FIG. 8 and discussed hereafter or may comprise a bladder 48 such as shown in FIG. 1. The bladder type chamber 26 of FIG. 1 is filled with compressed air through a valve 49 before immersion and shackling of the pipe conduit 22, where it is desired to float the pipe to location, or after the pipe has been immersed and shackled, depending on the installation procedure followed. The bladder 48 can be formed of a tough glass fiber reinforced plastic, for example, in a construction used for inflated boat rollers. The bladder-type chamber provides a bumper cap providing some protection to the cylindrical tube 24, which is particularly useful in shallow waters where accidental contact with a light craft may occur. By fabricating the floatation chamber in segments on the tube 24, the chambers can be designed for replacement. For example, in FIG. 3 a tongue fastener 50 the bladder slideably engages a groove fastener 51 on the cylindrical tube 24. A damaged bladder can be removed by underwater workers and a new bladder installed and inflated.

Referring to FIG. 4, a portion of the collection line 10 is shown with a dumping station 52 connected to the pipe conduit 22. The dumping station 52 comprises an entry conduit 54 which is constructed with an expandable bellows section 56 for tidal and wave compensation, and a float ring 58 for maintaining the dumping station 52 at the surface. Alternately the dumping station may comprise a simple stand pipe with a cover. The dumping station provides a collection point for small craft and ships to dispose of their wastewaters or bilge waters without fouling the bay or waterway.

The pipe conduit 22 in shallow waters is provided with a warning float 60 which is attached by a thin cable 62 to the collar band 29 to indicate the location of the pipe line. Similar marker floats can be employed in deeper waters to mark the location of the pipe for underwater inspectors.

Referring to the cross sectional view of FIG. 5, a typical gas release valve 64 is shown. The gas release valves are mounted at various intervals along the length of the pipe to release any entrapped air or gases generated by in line decomposition of the wastes in the wastewaters. The gas release valve comprises a vent 66, a ball cage 68 and an entrapped buoyant ball 70 in the cage. When the conduit is filled, the ball 70 floats to a blocking position in a ball seat 72 in the vent 66. This prevents entry of sea water into the system unless external pressures exceed internal pressures to a degree that they overcome the floatation of the ball. When gases collect in the cylindrical tube of the conduit, the ball falls allowing escape of the gases and entry of sea water, if the internal pipe flow does not immediately make up for the volume loss from escaped gases. In this manner, the cylindrical tube is maintained full of water and internal and external pressures can be substantially equalized preventing excessive stresses on the pipe structure.

It is to be understood that the structural configuration and construction of the pipe conduit in the pipe system can be varied. For example, with reference to FIG. 6, an oval shaped tube 74 is designed for use in shallow water in order that the height of the pipe conduit 76 be minimized. In FIG. 7, a pipe conduit 78 with dual cylindrical tubes 80 may be used either for shallow water configurations, or where the design limits of the cylindrical tube have been reached and the capacity need to be doubled. In such dual tube arrangement a single float member 82 can be used to advantage. The float member 82 is here fabricated from a polymer foam float material and prepared to conform to the dual tubes 80 as shown. Similarly, a single anchor pile 84 with a divide cable unit 86 is used for cost minimization.

Referring to FIG. 8, a pipe conduit 88 with a cylindrical tube 90 with a rigid floatation chamber 92 is shown. The rigid floatation chamber 92 is fabricated either separately and bonded to the cylindrical tube 90 or is fabricated coincidentally with the tube in an extrusion process. In the latter process the floatation chamber requires additional preparation by removal of segments of the extrusion at the pipe ends and fitting with end plates 94 to form discrete chambers along the length of each pipe segment.

Additional variations in the system may be made to advantage. For example, a weight 96 as shown in FIG. 8 may be used to anchor the buoyant conduit 88. Also, a rod 98 may interconnect the conduit 88 and anchor weight 96.

The pipe lines can be layed by conventional means, being forced down to the anchor connectors by a yoke or horse system or as noted the floatation chambers if provided with a valve system can be used to assist installation.

While in the foregoing specification embodiments of the present invention have been set forth in considerable detail for the purposes of making a complete disclosure of the invention, it should be apparent to those of ordinary skill in the art that numerous changes may be made in such details without departing from the spirit and principles of the invention.

What is claimed is:

1. A submerged pipe system for underwater transport of liquids in a water body having an underlying bed comprising:
    at least one pipe conduit having means for substantially equalizing inside and outside conduit pressures during underwater use;
    a floatation chamber attached to said pipe conduit, said combined pipe conduit and floatation chamber having a positive buoyancy during underwater use;
    anchor means attached to said pipe conduit for anchoring said combined pipe conduit and floatation chamber to the underwater bed wherein said pipe conduit and attached floatation chamber are located in an elevated location above the underwater bed.

2. The pipe system of claim 1 wherein said means for substantially equalizing inside and outside conduit pressure comprises a valve device with means for admitting water from the water body, in which the pipe is submerged.

3. The pipe system of claim 1 wherein said pipe conduit has a top portion and a bottom portion and said floatation chamber is attached to the top portion and said anchor means is connected to said bottom portion of said conduit.

4. The pipe system of claim 3 wherein said floatation chamber is filled with air.

5. The pipe system of claim 3 wherein said anchor means comprises a piling imbedded in the underwater bed, said piling including a connecting element connecting said piling to said conduit.

6. The pipe system of claim 3 wherein said anchor means comprises a weight member on said underwater bed, said piling including a connecting element connecting said piling to said conduit.

7. The pipe system of claim 3 wherein said valve device means comprises a ball, a ball cage, and a vent mounted to the top portion of said pipe conduit.

8. The pipe system of claim 1 comprising further at least one feeder line connected to said pipe conduit, said feeder line having means for delivering liquids from a location above the water body to said submerged conduit.

9. The pipe system of claim 1 wherein said floatation chamber comprises an air bladder connectable and removable from said conduit.

10. The pipe system of claim 1 wherein said pipe system comprises a liquid waste discharge having a termination means on said conduit for discharging wastes into said water body.

* * * * *